(12) United States Patent
Keinänen et al.

(10) Patent No.: US 12,566,500 B1
(45) Date of Patent: Mar. 3, 2026

(54) WEARABLE DEVICE INTEGRATING LIGHT-GUIDING ELEMENT FOR GAZE-TRACKING SYSTEM

(71) Applicant: Varjo Technologies Oy, Helsinki (FI)

(72) Inventors: Perttu Keinänen, Helsinki (FI); Mikko Ollila, Tampere (FI); Kaj Saarinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/978,870

(22) Filed: Dec. 12, 2024

(51) Int. Cl.
G06F 3/01 (2006.01)
G02B 27/01 (2006.01)
(52) U.S. Cl.
CPC ......... *G06F 3/013* (2013.01); *G02B 27/0172* (2013.01); *G02B 27/0179* (2013.01); *G02B 2027/0187* (2013.01)

(58) Field of Classification Search
CPC ... G06F 3/013; G02B 27/017; G02B 27/0172; G02B 27/0179; G02B 2027/0187
See application file for complete search history.

(56) References Cited

U.S. PATENT DOCUMENTS

2013/0170218 A1* 7/2013 Wolk ..................... G02B 6/005
362/296.01
2023/0393398 A1* 12/2023 Oh .......................... G06F 3/013

* cited by examiner

*Primary Examiner* — Cory A Almeida
(74) *Attorney, Agent, or Firm* — Ziegler IP Law Group, LLC.

(57) ABSTRACT

Disclosed is a device with a gaze-tracking system having a plurality of light emitters and at least one light sensor; and a light-guiding element implemented with respect to an optical element of the device, wherein the light-guiding element at least directs light emitted by the plurality of light emitters towards an eye of a user.

22 Claims, 2 Drawing Sheets

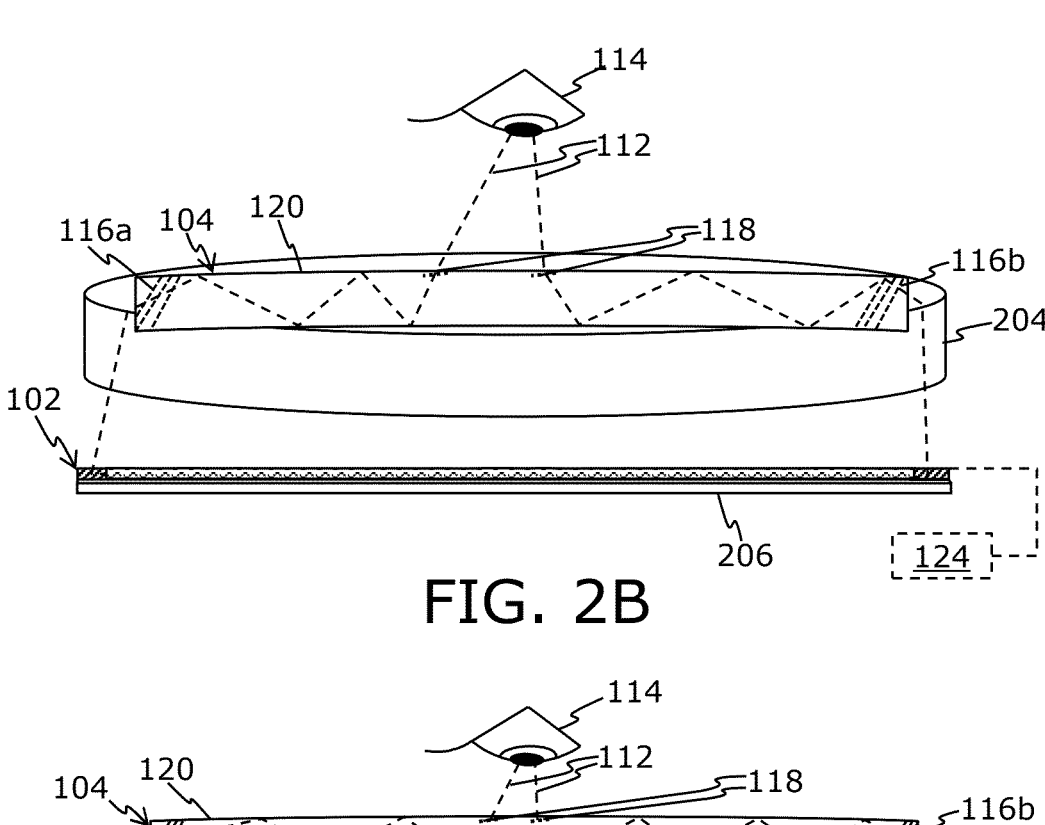
FIG. 2B
FIG. 2C
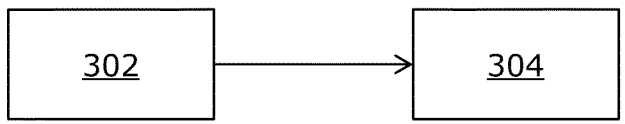
FIG. 3

WEARABLE DEVICE INTEGRATING LIGHT-GUIDING ELEMENT FOR GAZE-TRACKING SYSTEM

TECHNICAL FIELD

The present disclosure relates to devices that integrate light-guiding elements for gaze-tracking systems. Moreover, the present disclosure relates to methods for integrating light-guiding elements into devices comprising gaze-tracking systems.

BACKGROUND

In recent years, head-mounted displays (HMDs) and/or augmented reality (AR) glasses have gained widespread use in various applications, for example, such as in gaming, training, remote assistance, medical use, and similar. These devices frequently incorporate gaze-tracking system to monitor and respond to eye movements of user, allowing for an interactive and immersive experience. Typically, the gaze tracking system relies on infrared (IR) light glints, which are directed towards the eyes of the user and then reflected back to light sensors to capture direction and focus of the gaze of the eyes. However, designing an IR illumination system which is compact, efficient, and reliable within a limited space of the HMDs and/or AR glasses presents a significant technical challenge, particularly when considering the user who wears regular eyeglasses.

Conventionally, IR illumination in the gaze-tracking system is commonly provided by positioning IR light emitting diodes (LEDs) around display module or at an edges of a lens. This approach enables the IR light to reach the eyes, creating necessary glints for tracking the movement and position of the eyes relative to the display. However, such positioning of the IR LEDs require physical space around the display module or at the edges of the lens. This increases an overall dimension of the device, while complicating an assembly process of the device. Integrating the IR LEDS restricts design flexibility and can make it challenging to create devices that are compact and aesthetic, especially as demand for slimmer HMD and/or AR glasses increases. Additionally, the separate positioning of the IR LEDs around the display module or at the edges of the lens can introduce alignment challenges in the device that may impact the accuracy and efficiency of the gaze tracking system.

Despite a functionality of existing placement of the IR LEDs, these solutions have limitations for the user wearing eyeglasses along with the HMD and/or the AR glasses. Frames and the lenses of the eyeglasses can partially block or reflect the IR light, causing occlusions or introducing stray reflections that disrupts accuracy of tracking the movement of the eyes (i.e., gaze tracking). Moreover, positioning the IR LEDs at steep angles to work around the frames of the eyeglasses often results in increase in light leakage and other unwanted optical effects.

Therefore, in light of the foregoing discussion, there exists a need to overcome the aforementioned drawbacks.

SUMMARY

The aim of the present disclosure is to provide a device and a method for integrating a light-guiding element into a device comprising a gaze-tracking system to enhance precise control and direction of light. The aim of the present disclosure is achieved by a device and a method for integrating a light-guiding element into a device comprising a gaze-tracking system as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 2A, 2B, and 2C, illustrate different arrangements of the light-guiding element of FIG. 1 with respect to the optical element, in accordance with an embodiment of the present disclosure; and FIG. 3 illustrates steps of a method for integrating a light-guiding element into a device comprising a gaze-tracking system, in accordance with an embodiment of the present disclosure.

DETAILED DESCRIPTION OF EMBODIMENTS

Figure 1:
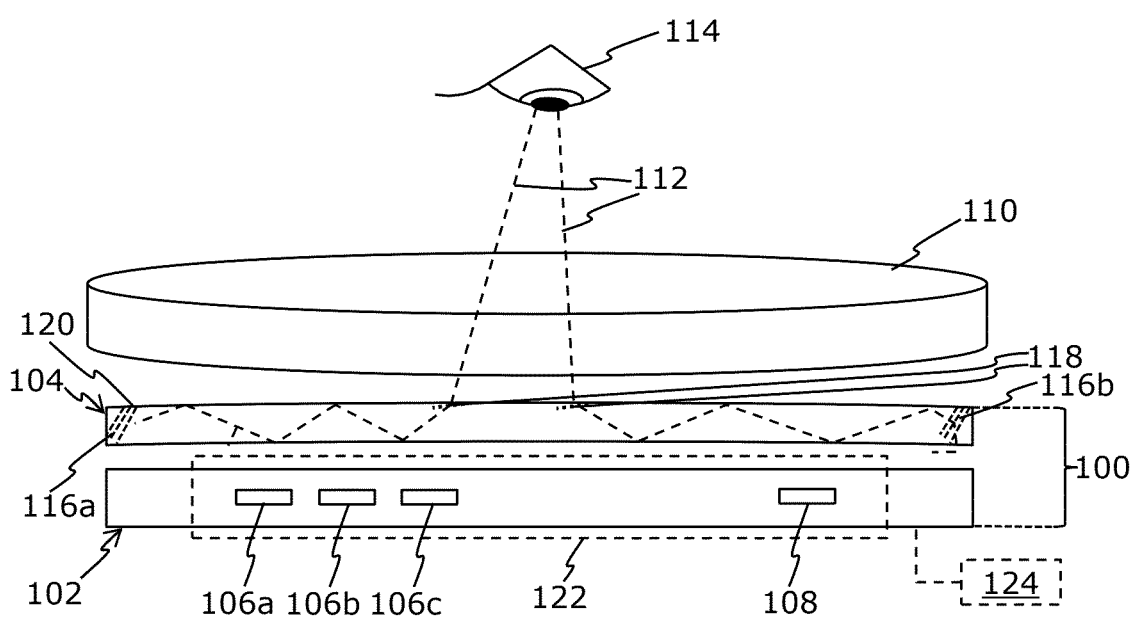
FIG. 1 illustrates a block diagram of a device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a device comprising:
- a gaze-tracking system comprising a plurality of light emitters and at least one light sensor; and
- a light-guiding element implemented with respect to an optical element of the device, wherein the light-guiding element at least directs light emitted by the plurality of light emitters towards an eye of a user.

The present disclosure provides the aforementioned first aspect, which improves functionality and integration of the gaze-tracking system in devices such as head-mounted displays (HMDs), augmented reality (AR) glasses, and similar. Herein, by incorporating the light-guiding element with respect to the optical element, the light-guiding element can at least direct the light emitted from the plurality of light emitters towards the eye of the user efficiently. This approach reduces a need for direct placement of the plurality of light emitters around the optical element, which helps to reduce a weight of the device and increases design flexibility. The light-guiding element controls and precisely delivers the light. This can lead to an improved tracking accuracy, as an infra-red (IR) light can be directed at ideal positions for creating stable glints, even when the user is wearing eyeglasses or other accessories. It will be appreciated that by consolidating path of the light, the light-guiding element minimizes a risk of stray reflections and interference, thereby enhancing an overall reliability and efficiency of the gaze-tracking system.

In a second aspect, the present disclosure provides a method for integrating a light-guiding element into a device comprising a gaze-tracking system, the gaze-tracking system comprising a plurality of light emitters and at least one light sensor, the method comprising:

implementing the light-guiding element with respect to an optical element of the device; and arranging the light-guiding element within the device such that the light-guiding element at least directs light emitted by the plurality of light emitters towards an eye of a user.

The present disclosure provides the aforementioned second aspect for integrating the light-guiding element into the device with the gaze-tracking system, that facilitates streamlined assembly and design customization. The method enables the light-guiding element to be implemented and arranged in a compact manner within optical structure of the device, facilitating the construction of slimmer and more aesthetically pleasing devices. By integrating the light-guiding element in an alignment with an optical path, this method allows for a more modular and versatile design, simplifying manufacturing and potentially reducing production costs. It will be appreciated that this integration technique enhances compatibility of the device with diverse user needs, particularly by accommodating the user who wear eyeglasses or other accessories. By minimizing potential obstructions and alignment issues, the integration approach ensures that the gaze-tracking system functions accurately and reliably for a broader range of users, thereby improving the overall usability and appeal of the device.

The term "device" refers to a configuration of optical components designed to manipulate and control propagation of the light. Examples of the device may include, but are not limited to, a head-mounted display (HMD), an augmented reality (AR) glass, a virtual reality (VR) headset, and a wearable optical system.

Optionally, the device is one of: a wearable device, a head-mounted display device, a set of extended-reality glasses. In an embodiment, the device is implemented as the wearable device. In this regard, the term "wearable device" refers to any electronic device that is designed to be worn over the eyes of the user, often integrating various sensors and technologies for interaction, monitoring, data collection, and similar. Examples of the wearable device may include, but are not limited to, smart glasses, AR glasses, VR headsets, and other eyewear-based devices that incorporate the gaze-tracking system.

In another embodiment, the device is implemented as the head-mounted display device. The term "head-mounted display device" refers to specialized equipment that is configured to present an extended reality (XR) environment to the user when said HMD, in operation, is worn by the user on his/her head. The HMD is implemented, for example, as an XR headset, a pair of XR glasses, and the like, that is operable to display a visual scene of the XR environment to the user. It will be appreciated that when the device is the HMD, it enables immersive user experiences by directly engaging in the user's field of view, allowing for seamless integration of virtual or augmented content with physical world, improving interaction and immersion of the user.

In yet another embodiment, the device is implemented as the set of extended-reality glasses. Herein, the term "extended-reality" encompasses virtual reality (VR), augmented reality (AR), mixed reality (MR), and the like. The set of extended-reality glasses use AR to overlay digital content onto the real world, VR to immerse users in simulated environment, or MR to blend both the AR and the VR or provide a fully immersive view to the user. It will be appreciated that the set of extended-reality glasses, by combining virtual and real-world elements, offers significant flexibility, enabling a wide range of applications from entertainment to industrial use, while providing a lightweight and comfortable form factor suitable for extended use over time.

Optionally, the device is implemented as a set of AR glasses. Herein, the set of AR glasses use the AR to overlay digital content directly on to the real-world. The set of AR glasses uses a transparent or a semi-transparent display to project information (for example, such as navigation cues, interactive interface, contextual data). The set of AR glasses offer an intuitive and an immersive way to interact with digital information in a context of the real world.

A technical effect of the aforementioned feature is that it provides flexibility in how gaze-tracking technology can be embedded in various devices, making it applicable across a wider range of user experiences, from VR to wearable health monitoring systems.

Throughout the present disclosure, the term "gaze-tracking system" refers to a subsystem within the device, wherein the gaze-tracking system is configured to monitor and determine direction and focus of gaze of the user's eyes. The gaze-tracking system typically operates by emitting the light towards the eyes of the user and capturing reflections or glints, that occurs on surface of the eye. Through data processing, the gaze-tracking system analyzes these reflections to compute eye movements and establish where the user is looking.

The term "light emitter" refers to a component within the gaze-tracking system that generates and projects the light, towards the eyes of the user. In one instance, the plurality of light emitters are integrated into the gaze-tracking system. In another instance, the plurality of light emitters are arranged on a surface of the gaze-tracking system. In this regard, the plurality of light emitter generate and project the light towards the eyes of the user. The plurality of light emitters are usually in a form of light-emitting diodes (LEDs). The function of the plurality of light emitters is to emit light which is reflected (namely, glinted) from surface of the eye that the gaze-tracking system can detect and analyze for tracking movement of the eyes. Optionally, the plurality of light emitters are infrared light emitters.

The term "light sensor" refers to a component in the gaze-tracking system that is designed to capture the light that is reflected off the user's eyes, specifically the glints created by the plurality of light emitters. In one instance, the at least one light sensor is arranged on or integrated within the gaze-tracking system in such a manner that said at least one light sensor is able to directly receive the light that is reflected from the user's eyes. Moreover, the at least one light sensor converts captured light data into electronic signals, which are then processed to determine a position and an orientation of the eyes of the user. Examples of the at least one light sensor may include, but are not limited to, photodiodes, infrared (IR) cameras, charge-coupled device (CCD) sensors, and complementary metal-oxide-semiconductor (CMOS) sensors. The at least one light sensor is selected based on at least one of: a sensitivity to light, a resolution of the at least one light sensor, and a response speed of the at least one light sensor, to ensure accurate and reliable gaze tracking.

When in operation, the plurality of light emitters emits the light, which reflects off of specific points on the eyes, thus creating glints. The at least one light sensor detects these reflections and transmits data to a processor, wherein the processor is configured to analyse positions of the glints on the surface of the eye to compute gaze direction of the user. By strategically positioning the plurality of light emitters and the at least one sensor within the device, movements and direction of the user's eyes is reliably captured, thus providing an accurate gaze-tracking data. It will be appreciated that inclusion of the at least light sensor with high sensitivity and precision allows for accurate detection of the glints, even under varying environmental conditions such as different lighting and/or when the user wears glasses. This results in a more robust and reliable gaze-tracking system that can operate across a wide range of scenarios of the user, ensuring consistent performance and usability.

Optionally, the plurality of light emitters are arranged within a predefined region of an active area of a display module of the device. In this regard, the term "display module" refers to a specialized component that is configured to present visual content (namely, visual output) to the user when the device is in operation. Notably, the display module houses an active area where the plurality of light emitters are arranged and where visual output is provided to the user. The term "predefined region" refers to a specific, predetermined area within a defined space of the display module, where the plurality of light emitters are arranged. The predefined region is selected to optimize the illumination for the gaze-tracking system, ensuring accurate detection of the eye movements and creation of stable glints. Optionally, the predefined region of the active area of the display module is at least one of: an inactive region of a display, an occluded region of the display that would be invisible to the user of the device, a peripheral region of the display, a backlight of the display module. The term "active area" refers to a portion of the display module that is capable of displaying visual content to the user. The active area includes pixels or subpixels that generate visible output, for example, such as texts, images, videos, and similar that the device presents. The active area is the functional region of the display module responsible for interacting with the user through visual feedback.

It will be appreciated that by arranging the plurality of light emitters within the predefined region of the active area of the display module, the device optimizes use of available space, ensuring efficient integration of both the display and gaze-tracking components. It will also be appreciated that this arrangement allows for controlled and consistent illumination of the eyes of the user, ensuring that the emitted light is directed precisely where it is needed for an accurate gaze tracking. By embedding the plurality of light emitters within the display module, the device can better manage alignment and positioning of the light being emitted, thereby reducing potential misalignment and enhancing the reliability of the gaze-tracking system. Moreover, the predefined region ensures that the plurality of light emitters can be optimized for various display sizes and configurations, offering greater flexibility in design of the device. This enables manufacturers to adapt the gaze-tracking system to a range of devices with different screen sizes or display configurations without compromising performance. A technical effect of the aforementioned feature is that it optimizes spatial configuration, ensuring efficient use of the available space while enabling precise illumination for accurate gaze-tracking performance.

Throughout the present disclosure, the term "optical element" refers to a component in the device that manipulates the light, whether through transmission, reflection, refraction, diffraction, or similar. The optical element is designed to control the propagation of the light to achieve desired effects, such as focusing, redirecting, and modifying the path of the light or properties of the light. In this regard, the optical element focuses or shaped a path of the light.

Optionally, the optical element is one of: a lens, a mirror, a beam splitter, a substrate, a display module, a polarizer, a diffuser. In this regard, each of these components serves a specific function in guiding, manipulating, and controlling the path of the light within the device, ensuring that the emitted light is directed, focused, and modified according to needs of the device. The lens can focus or defocus on the light, enhancing the accuracy of light targeting for precise eye-tracking or display applications. The mirror is used to redirect path of the light within the device, allowing for efficient use of space while maintaining optical accuracy. The beam splitter divides the light into separate paths, enabling simultaneous use of the light for multiple functions, such as tracking and displaying. The substrate acts as a supporting base for the optical element, providing stability and alignment to ensure optimal light transmission and positioning. The display module serves as an interface for presenting visual content to the user, integrating the light-guiding element to align visuals with the user's gaze. The polarizer filters the light based on polarization, reducing glare and enhancing contrast for better visibility and accuracy in the display or sensing applications. The diffuser scatters the light evenly, creating a soft illumination effect that reduces harshness and improves the distribution of the light across viewing area. It will be appreciated that selecting a suitable optical element allows for precise control over the path of the light, optimizing distribution of the light and enhancing the accuracy of functionality of the device. It will also be appreciated that the flexibility to select from these optical elements provides design versatility, enabling the device to be customized for specific requirements, such as minimizing size while maintaining high optical performance or maximizing light efficiency for different optical applications. The aforesaid types of the optical element are well-known in the art. A technical effect of selecting the optical element from any one of: the lens, the mirror, the beam splitter, the substrate, the display module, the polarizer, the diffuser is that it enables for precise customization of the path of the light within the device, improving manipulation of the light, optical performance, and versatility for various applications.

Throughout the present disclosure, the term "light-guiding element" refers to an optical component designed to control, direct, and/or manipulate the propagation of the light within the device. Different implementations of the light-guiding element with respect to the optical element are described in detail, later. Moreover, the light-guiding element reflects the light emitted by the plurality of light emitters towards the eye, and redirects the light that is reflected from the user's eye, towards the at least one light sensor. The light-guiding element is aligned with respect to the optical element in such a manner that the light emitted from the plurality of light emitters is manipulated by the light-guiding element, such that said light is directed towards the eyes of the user.

Notably, the light-guiding element is not just placed arbitrarily within the device, but its positioning and function are considered in relation to the characteristics of the optical element. The characteristics of the optical element is at least one of: a focal length, a refractive index, a shape, an alignment, of the lens. By directing the light emitted by the plurality of light emitters precisely towards the eyes of the user, the light-guiding element enhances performance of the gaze-tracking system, ensuring that the glints are stable and clear for accurate tracking. It will be appreciated that this approach reduces need for complex and bulky arrangements of the plurality of emitters around the display module or lenses, providing a compact and streamlined design of the device. It will also be appreciated that the light-guiding element helps in mitigating interference from external light sources or other accessories, such as eyeglasses, by consolidating and controlling the path of the light. This improves a reliability and accuracy of the gaze-tracking system, making it adaptable to various scenarios of the user, including the user who wears eyeglasses or other accessories. A technical effect of implementing the light-guiding element with respect to the optical element of the device is that it improves an efficiency of delivery of the light towards the eyes of the user.

Optionally, the light-guiding element comprises:

a light incoupling structure for enabling the light emitted by the plurality of light emitters to enter the light-guiding element, a light outcoupling structure for enabling the light to exit the light-guiding element towards the eye, and a light-guiding part, either flat or curved, providing an optical coupling between the light incoupling structure and the light outcoupling structure, for transferring the light through the light-guiding element by utilizing total internal reflection of the light.

In this regard, the term "light incoupling structure" refers to an arrangement or a feature within the light-guiding element that facilitates an entry of the light emitted by the plurality of light emitters into light-guiding path. This structure may be designed as a specific shape, an angle, a surface feature, and similar that optimally redirects the emitted light into the light-guiding element to ensure efficient light transfer. The term "light outcoupling structure" refers to an arrangement or a feature within the light-guiding element that enables the emitted light to exit the light-guiding element towards the eyes of the user. This structure may be designed with optical features for example, such as angled facets, lenses, surface treatments, and similar, that facilitate precise redirection of the light out of the light-guiding element with minimal loss and optimal direction. The "light-guiding part" refers to a portion of the light-guiding element that transmits the light from the incoupling structure to the outcoupling structure. The light-guiding part relies on the principle of total internal reflection to efficiently guide the light within the light-guiding element, ensuring that the light travels along the desired path without significant loss of intensity or direction. Optionally, the light-guiding part is flat. Alternatively, optionally, the light-guiding part is curved. The term "optical coupling" refers to a process or a mechanism by which the light is efficiently transferred between the light incoupling structure and the light outcoupling structure, within the light-guiding element, ensuring minimal loss of intensity during transfer.

Herein, the light incoupling structure allows the light emitted by the plurality of light emitters to enter the light-guiding element, effectively directing the light into guided path. The light-guiding part, provides a pathway for the light to travel from the light incoupling structure to the light outcoupling structure. This travelling of the light occurs through the principle of total internal reflection, allowing the light to be contained within the light-guiding element with minimal loss. The light-guiding part ensures that the light remains confined and is directed until it reaches the light outcoupling structure, which then allows the light to exit towards the eyes of the user. It will be appreciated that by utilizing the light incoupling structure and the light outcoupling structure, the light is efficiently directed into and out of the light-guiding element, respectively, optimizing the use of available space within the device while minimizing loss of the light. This arrangement enhances an overall efficiency of the gaze-tracking system by ensuring that the path of the light is controlled and focused, reducing the need for complex alignment of external components.

It will also be appreciated that by utilising the total internal reflections of the light in the light-guiding part, an overall light transmission efficiency is improved, thus ensuring that the light is guided along an intended path without significant loss or distortion. This facilitates to the stability and accuracy of the gaze-tracking system, particularly in environments where space constraints or design flexibility are essential. Notably, the intended path refers to a desired trajectory that the light follows within the device according to the design of the device. Furthermore, configuring the light-guiding element either flat or curved offers design flexibility, allowing for adjusted solutions depending on form factor of the device and specific requirements of the gaze-tracking system. This flexibility can improve integration into various device types, ensuring that the device is adaptable to diverse user needs and configurations.

A technical effect of the aforementioned feature is that the design of the light-guiding element with the light incoupling structure, the light outcoupling structure, and the light-guiding part allows for efficient and controlled transmission of the light.

Optionally, the light incoupling structure comprises a plurality of light incoupling elements comprising at least two of: a prismatic structure, a triangular microstructure, diffraction gratings, a lens, a tapered structure, a microfaceted mirror. In this regard, the term "light incoupling element" refers to an element that facilitates an entry of the light into the light-guiding element. The plurality of light incoupling elements work together to capture and redirect the emitted light into the light-guiding element. Herein, the prismatic structure can bend or reflect the light at specific angles by refracting the light as it enters or exits different surfaces. This feature enables precise control over an entry angle of the light into the light-guiding element, ensuring that it follows the intended path within the device. By aligning the light with optimal guiding path, the prismatic structure minimizes loss of the light and enhances overall efficiency of the device. It will be appreciated that this control enables for higher coupling efficiency, reducing power requirements for the plurality of light emitters and thereby extending battery life in portable devices.

Moreover, the triangular microstructure reflects or redirects the light at controlled angles through total internal reflection or refraction, depending on geometry and placement of the triangular microstructure. This setup can direct the light accurately into guiding path of the light. The use of the triangular microstructure ensures that the light follows a precise path within the light-guiding element, minimizing stray reflections. It will be appreciated that this structure enables a compact design of the device while ensuring efficient entry and transmission of the light, thereby facilitating streamlined configurations while maintaining optimal optical performance.

Furthermore, the diffraction gratings can split or redirect the light based on its wavelength, creating a controlled angle of entry of the light. This capability is especially useful for devices that operate with narrow wavelength bands, for example, such as the IR light used in gaze-tracking. By controlling an angle of entry and separating the light as needed, diffraction gratings enable high precision in directing the light through the light-guiding element. It will be appreciated that the diffraction gratings provides consistent distribution of the light, improving the stability and accuracy of the gaze-tracking system across different lighting conditions and eye positions.

Moreover, the lens can focus on the emitted light before it enters the light-guiding element, concentrating the light and directing it along the intended path. This helps to prevent scattering of the light and maintains a strong signal. By focusing on the light efficiently, the lens reduce the amount of light lost during transmission, improving an intensity and quality of the light reaching towards the eyes of the user. It will be appreciated that the lens enhance tracking accuracy by ensuring that more light reaches target area, even if the user is moving or adjusting their gaze.

Additionally, the tapered structure gradually narrows or widens the path through which the light is directed, which can help to spread the light as it enters the light-guiding element. This is particularly useful for managing intensity of the light across the light-guiding element. It will be appreciated that the tapered structure provides controlled distribution of the light, allowing for even illumination across the light-guiding element.

Moreover, the micro-faceted mirror comprises multiple small, angled facets that can reflect the light precisely towards the light-guiding path. The micro-faceted mirror allow for a highly controlled reflection of the light into the light-guiding element, even when the plurality of light emitters are positioned at various angles. It will be appreciated that the micro-faceted mirror provide improved consistency in light delivery, which helps to maintain accurate and reliable gaze-tracking performance regardless of the movement of the user. The aforesaid light incoupling elements are well-known in the art.

A technical effect of utilising the at least two of the plurality of light incoupling elements is that it enables efficient entry of the light into the light-guiding element, thereby optimizing distribution of the light and minimizing loss.

Optionally, the light outcoupling structure comprises a plurality of light outcoupling elements comprising at least two of: a micro-scale diffuser, a micro-prism, a micro-lens, a v-groove, surface gratings, surface scattering particles, a reflective film or coating. In this regard, the term "light outcoupling element" refers to an element within the light-guiding element designed to enable efficient exit of the light from the light-guiding path towards the eyes of the user. The micro-scale diffuser scatters the light as it exits the light-guiding element, spreading the light over a wider area. It will be appreciated that the use of the micro-scale diffuser ensures more uniform distribution of the light, enhancing the accuracy of the gaze tracking by ensuring consistent light interaction with the eyes of the user. The micro-prism refracts the light at specific angles, directing it precisely towards the eyes of the user. It will be appreciated that incorporating the micro-prism allows for highly controlled directionality of the light, improving the precision of the device and ensuring optimal illumination for the gaze tracking. The micro-lens focuses or redirects the light to a specific location or an angle. It will be appreciated that the micro-lens enable precise focusing of the light, which is essential for directing the light accurately towards the eyes of the user for reliable gaze tracking. The v-groove reflects the light at predetermined angles, redirecting it along the intended path. It will be appreciated that the v-groove provides an effective method for controlling exit direction of the light, ensuring that the light is guided efficiently towards the eyes of the user. The surface gratings diffract the light into multiple directions based on the periodic pattern etched onto surface.

It will be appreciated that the surface gratings enable fine control over directionality of the light, ensuring that the light exits in the desired manner for the accurate gaze tracking. The surface scattering particles scatter the light as it exits the light-guiding element, diffusing it across a larger area. It will be appreciated that the surface scattering particles help to achieve an even light distribution, ensuring that the light interacts uniformly with the user's eye for consistent gaze-tracking performance. The reflective film or coating redirects the light by reflecting it off the surface of the light-guiding element. It will be appreciated that the reflective film or coating reduce loss of the light, ensuring that the light is directed efficiently and effectively, maintaining optimal illumination for precise gaze-tracking. The aforesaid light outcoupling elements are well-known in the art.

A technical effect of utilising the at least two of the plurality of light outcoupling elements is that it enhances the control over light distribution and directionality, thereby ensuring uniform illumination and precise light output for improved gaze tracking accuracy.

Optionally, when the plurality of light emitters are infrared light emitters, the light incoupling structure and the light outcoupling structure are designed to guide light in the near-infrared (NIR) spectrum in range of 710 nanometers (nm) to 1000 nm. In this regard, the plurality of light emitters in the device emit the IR light within specified NIR spectrum range, which is then guided through the light-guiding element. Herein, a wavelength of the light in the NIR spectrum may, for example, lie in a range from 710, 711, 712, 714, 717, 720, 725, 730, 740, 750, 770, 800, 850, 900, or 990 nanometers (nm) up to 715, 770, 820, 860, 890, 920, 940, 960, 970, 980, 990, 995, 998, 999, or 1000 nm. Optionally, a wavelength of the light in the NIR spectrum lies in a range of 710 nm to 2500 nm.

Herein, the light incoupling structure efficiently directs the IR light into the light-guiding element, while the light outcoupling structure ensures that the IR light exits the light-guiding element and reaches the eyes of the user. The light incoupling structure and the light outcoupling structure are specifically designed to handle the IR light within the NIR spectrum range, which may include optical features such as lenses, micro-prisms, surface gratings, and similar optimized for the NIR wavelengths. The light incoupling structure and the light outcoupling structure ensures minimal loss of light while directing it along the intended path. It will be appreciated that by designing the light incoupling structure and the light outcoupling structure to specifically guide the IR light in the NIR spectrum, the device ensures efficient transmission of the IR light, optimizing the performance of the gaze-tracking system while minimizing impact on the user's visual experience. It will also be appreciated that using the NIR spectrum range of 710 nm to 1000 nm helps to achieve accurate eye-tracking without causing discomfort or distraction to the user, as the light is invisible to human eye. Furthermore, it will be appreciated that the design of the light incoupling structure and the light outcoupling structure for this specific wavelength range improves efficiency of the light and reduces losses, providing a reliable and precise gaze-tracking capability. A technical effect of the aforementioned feature is that the light incoupling and the light outcoupling structure designed for the NIR spectrum enhances the efficiency of transmission of the IR light and ensuring accurate, non-intrusive gaze-tracking without interference of visible light.

Optionally, the light directed by the light-guiding element towards the eye is incident upon the eye within an angular range of 0 degree to 45 degrees relative to a surface normal of the eye. In this regard, the term "surface normal" refers to a line that is perpendicular to outermost layer of the eye (such as corneal surface) at a point where the light is incident. The surface normal of the eye defines reference axis for measuring angles of light incidence and reflection, ensuring precise alignment of the light directed towards the eye in relation to geometry of the eye. Herein, the angular range may, for example, lie in a range from 0, 1, 2, 3, 5, 7, 10, 15, 20, 25, 30, 36, or 44 degrees up to 4, 12, 20, 27, 33, 38, 42, 43, 44, or 45 degrees. It will be appreciated that directing the light within the angular range of 0 degrees to 45 degrees relative to the surface normal of the eye ensures efficient reflection of the light, minimizing a possibility of light scattering or distortion, which is essential for accurate gaze-tracking measurements. It will also be appreciated that said angular range ensures a comfortable experience of the user by preventing excessive brightness or discomfort, as the light is directed at optimal angles for both performance and user comfort. A technical effect of directing the light towards the eye within the angular range of 0 degrees to 45 degrees relative to the surface normal of the eye is that it optimizes the reflection of the light from the eye's surface, improving the accuracy of gaze-tracking while minimizing discomfort and interference from stray light.

Optionally, the light-guiding element also directs reflections of the light from the eye, towards the at least one light sensor. In this regard, for capturing the reflections of the light, the light-guiding element is designed with the ability to guide not only the incident light but also the light that is reflected back from surface of the eye, such as cornea or retina. These reflections are then efficiently transmitted through the light-guiding element towards the at least one light sensor. The at least one light sensor collects data related to the reflected light, which can then be analysed to determine the position of the eyes of the user. This can include measuring gaze direction, pupil size, and/or other eye-related parameters for intended optical application. It will be appreciated that the ability to capture and guide reflections of the light from the eye towards the at least one light sensor enhances the precision and sensitivity of the device, enabling more accurate tracking of eye movements or gaze direction. It will also be appreciated that by integrating both an incident light path and reflected light path within the gaze-tracking system, the device can offer enhanced compactness and performance, optimizing the design while maintaining high optical accuracy. A technical effect of the aforementioned feature is that it enables the device to gather essential eye-related data by capturing reflections of the light from the eyes, ensuring an accurate and efficient measurement of the gaze direction, the eye movements, and similar.

Optionally, the optical element is made of at least one of: glass, plastic, a flexible material. In this regard, the glass is used when optical clarity and durability are paramount. The glass provides high optical quality and is resistant to scratching, making it ideal for lenses or other optical elements where clarity and longevity are important. Examples of the glass may include, but are not limited to, a borosilicate glass, a fused silica, and an optical crown glass. It will be appreciated that the use of the glass ensures superior optical clarity and durability, which is essential in applications requiring high precision and long-term performance.

Moreover, the plastic material is often used when cost, weight, and ease of manufacturing are significant considerations. The plastic can be molded into various shapes and sizes and is commonly used in optical elements where flexibility and lower cost are desired while maintaining optical performance. Examples of the plastic may include, but are not limited to, acrylic (Poly methyl methacrylate), polycarbonate, polystyrene, and similar, which provide adequate optical clarity and are lightweight for mass production. It will be appreciated that the use of the plastic provides lightweight and cost-effective solutions, which are particularly advantageous in large-scale production, while still preserving adequate optical performance.

Moreover, the flexible material is used when there is a need for flexibility or to conform to specific shapes or surfaces. Notably, flexible optical elements can be used in applications like wearable devices that require adaptable optical components to fit various designs or changing shapes. Examples of the flexible material may include, but are not limited to, silicone, flexible polymers, and elastomers, which can be molded into curves or other non-rigid forms while maintaining optical functionality. It will be appreciated that the optical element made of the flexible material allows the design of the device that can adapt to varying form factors, particularly in wearable or portable devices.

A technical effect of the optical element made of the at least one of: the glass, the plastic, the flexible material, is that it enables the device to achieve the necessary balance of optical clarity, durability, and adaptability across different applications such as high-precision imaging, lightweight portable devices, flexible wearable devices and similar.

Optionally, the optical element has one of: a curved surface, a planar surface, with respect to which the light-guiding element is implemented. In this regard, the term "curved surface" refers to a surface that is not flat but instead has a continuous, smooth curvature, which can either be a concave surface (inward-curved) or a convex surface (outward-curved). Notably, a curvature of the curved surface causes the direction of light rays to be altered as they interact with the surface, either focusing them to a specific point (in the case of concave surfaces) or diverging them (in the case of convex surfaces). The term "planar surface" refers to a flat, a two-dimensional surface with no curvature. Typically, the light incident upon the planar surface travels in straight lines, with the direction of the light either remaining unchanged or being reflected at a predictable angle, according to the laws of reflection or refraction. The light-guiding element may be implemented on one of: the curved surface, the planar surface, in proximity of such surfaces, or similar. It will be appreciated that the use of the curved surface for the optical element allows for more precise control over the direction and convergence of the light. It will also be appreciated that the use of the planar surface offers simplicity in design and allows for consistent, predictable behavior of the light, particularly when there is a need for uniform distribution of the light or minimal alteration of the path the light. Furthermore, it will be appreciated that the selection between the curved surface and the planar surface offers design flexibility to optimize the performance of the device for different optical functions, such as light focusing, beam shaping, maintaining light directionality, and similar. A technical effect of the aforementioned feature is that the configuration of the light-guiding element with respect to the curved surface or the planar surface facilitates efficient light manipulation, ensuring optimal light distribution and enhancing the overall optical performance of the device.

Optionally, the light-guiding element is implemented as a nanostructured film that is laminated onto the one of: the curved surface, the planar surface, of the optical element. In this regard, the term "nanostructured film" refers to a thin layer of material that exhibits structural features or properties at a nanometer scale, typically, with a thickness of less than 100 nm. The nanostructured film is designed with a pattern or configuration that interacts with the light in specific ways, such as through diffraction, refraction, total internal reflection, and similar. The nanostructured film is laminated onto the one of: the curved surface or the planar surface, of the optical element, ensuring that it follows the geometry of the optical element. Notably, lamination process can involve the use of adhesive materials or bonding methods that secure the nanostructured film in place, providing long-term stability. Once laminated, the nanostructured film modifies the path or behavior of the light as it interacts with structure of the film, guiding the light according to the intended optical function. The use of the nanostructured film is intended to enhance the control and manipulation of the light at very small scales. Notably, the nanostructured film is capable of directing the light with high precision, improving optical performance by minimizing scattering, controlling light propagation, achieving desired light patterns, and similar. It will be appreciated that the lamination of the nanostructured film to the optical element enables it to follow the surface geometry, ensuring optimal light interaction across both the curved surface and the planar surface.

A technical effect of implementing the light-guiding element as the nanostructured film laminated onto one of the: the curved surface, the planar surface, of the optical element is that it enables precise manipulation of the light at nanoscale, thereby improving directionality of the light, minimizing losses, and enhancing the optical performance of the device across a wide range of applications.

Optionally, the device further comprises a processor configured to:

control the gaze-tracking system such that the plurality of light emitters emit the light towards the light-guiding element, and the at least one light sensor captures sensor data pertaining to reflections of the emitted light from an ocular surface of the eye; and determine a gaze direction of the eye, based at least on the sensor data.

In this regard, the term "processor" refers to a computational element that is operable to execute the software framework. Examples of the processor may include, but are not limited to, a microprocessor, a microcontroller, a complex instruction set computing (CISC) microprocessor, a reduced instruction set computing (RISC) microprocessor, a very long instruction word (VLIW) microprocessor, or any other type of processing circuit. Herein, the processor is communicably coupled to the gaze-tracking system. The term "sensor data" refers to a data collected by the at least one light sensor that records the reflected light from the ocular surface of the eye. The sensor data can be in a form of a voltage signal, a current signal, a digital signal, and similar that represent an intensity, a position, and other characteristics of the detected reflections. The term "ocular surface" refers to an external, visible portion of the eye that the light interacts with, including the cornea, iris, and anterior surface of the lens. The ocular surface receives incoming light and reflects the light back toward the at least one light sensor in the gaze-tracking system. The ocular surface is essential for optical and visual processes and plays an essential role in the gaze-tracking system that tracks the eye movement for applications like virtual reality, accessibility, medical diagnostics, and similar.

Herein, the processor is configured to control the plurality of light emitters to direct the light towards the light-guiding element, ensuring that the emitted light is properly aligned and directed at the ocular surface. Once the light interacts with the eye, a portion of the light is reflected back towards the at least one light sensor. The at least one light sensor captures this reflected light and generates the sensor data. The processor then analyses the sensor data to determine the location or direction of the reflected light, which is indicative of the gaze direction of the eye. By interpreting the sensor data from the at least one light sensor, the processor can determine the gaze direction with high accuracy and use it for various applications, such as controlling functions of the device or enabling interaction with digital content. It will be appreciated that by accurately determining the gaze direction of the eye based on the reflected light from the ocular surface, the device can offer precise eye-tracking capabilities for a wide range of user applications, improving user experience and interaction with the device. It will also be appreciated that the ability of the processor to analyse the sensor data in real-time enhances the responsiveness of the gaze-tracking system. Furthermore, the precise control over the light emission and the sensor data processing enables the device to function effectively in various lighting conditions, contributing to robust performance across different environments. A technical effect of the aforementioned feature is that it enables an accurate determination of the gaze direction of the eyes of the user by controlling and processing the interaction between the plurality of light emitters, the at least one light sensor, and the ocular surface.

The present disclosure also relates to the second aspect as described above. Various embodiments and variants disclosed above, with respect to the aforementioned first aspect, apply mutatis mutandis to the second aspect.

Optionally, the step of implementing the light-guiding element with respect to the optical element comprises one of:

arranging the light-guiding element on one of: a planar surface, a curved surface, of the optical element;

arranging the light-guiding element in proximity of one of: a planar surface, a curved surface, of the optical element;

embedding the light-guiding element within the optical element.

In this regard, the optical element is the lens. In one implementation, the light-guiding element can be positioned directly on the surface of the optical element. In this regard, adhesive bonding, lamination, or other attachment methods could secure the light-guiding element onto the surface of the optical element, aligning it closely with the optical path. It will be appreciated that this configuration ensures a stable, secure attachment of the light-guiding element, minimizing potential misalignment and optimizing transmission efficiency of the light.

In another implementation, the light-guiding element can be arranged at a distance in a range of 0.001 millimetres (mm) to 5 mm in contact with one of: the planar surface, the curved surface, of the optical element. The distance may, for example, lie in a range from 0.001, 0.002, 0.003, 0.005, 0.008, 0.011, 0.015, 0.02, 0.03, 0.05, 0.07, 0.08, 0.1, 0.2, 0.3, 0.5, 0.8, 1.1, 1.5, 2.0, or 3.5 mm up to 0.001, 1.5, 2.5, 3.0, 3.4, 3.8, 4.1, 4.4, 4.6, 4.7, 4.8, 4.9, or 5.0 mm. It will be appreciated that varying the distance between the light-guiding element and the optical element within said range provides flexibility in optimizing light coupling efficiency, which can be adjusted for different optical performance requirements.

In yet another implementation, the light-guiding element can be arranged within structure of the optical element itself. Typically, various manufacturing techniques may be utilized to incorporate the light-guiding element within the structure of the optical element itself. For example, such as molding techniques, layering techniques, and other manufacturing techniques may be utilized that incorporate the light-guiding element within the optical element. This ensures that the light-guiding element is securely housed and protected within the structure of the optical element. It will be appreciated that this configuration enhances an overall compactness and structural integrity of the device, providing more efficient design by minimizing need for additional components or external housing.

A technical effect of the aforementioned feature is that it provides precise control over the positioning of the light-guiding element with respect to the optical element, enabling optimized manipulation of the light and enhancing the overall performance and accuracy of the gaze-tracking system. This flexibility in arrangement ensures effective interaction with both the planar surface and the curved surface.

Optionally, the arrangement of the light-guiding element within the device is one of:

the light-guiding element is arranged on an optical path between the optical element and an exit optical element of the device;

the light-guiding element is arranged within an exit optical element of the device; or the light-guiding element is arranged on an optical path between the eye and an exit optical element of the device.

In this regard, the term "optical path" refers to a trajectory followed by the light as it travels through optical components of the device. Notably, the optical path is essential for determining behavior of the light and for optimizing the performance of the device for applications like imaging, focusing, light guiding, and similar. The term "exit optical element" refers to an optical component that is positioned at the end of the light path and controls or directs the light as it exits the device. The exit optical element can perform functions such as focusing, shaping, collimating, directing, and similar. Examples of the exit optical element may include, but are not limited to, a lens, a mirror, a prism, a filter, an optical fiber, a waveguide, and a beamsplitter.

Moreover, in this regard, the optical element is the display module, and the exit optical element is the lens. In one implementation, the light guiding element can be positioned on the optical path between the optical element and the exit optical element. This enables the light-guiding element to direct or manipulate the light traveling through optical components of the device before it exits the device, ensuring proper distribution and focusing of the light. It will be appreciated that this configuration allows for precise control of the light within the device, optimizing the path of the light and enhancing overall optical performance, which is particularly valuable in applications requiring high-quality light management, such as in displays, optical sensors, and similar.

In another implementation, the light-guiding element can be arranged within the exit optical element itself. The exit optical element is the component responsible for directing the light out of the device and the light-guiding element is arranged inside it to manipulate the light that exits. Embedding the light-guiding element within the exit optical element ensures that the light is controlled as it exits the device. It will be appreciated that this integration results in a compact, streamlined design, reducing the need for additional components and minimizing potential alignment issues, thereby enhancing the efficiency and precision of control of the light within the device.

In yet another implementation, the light-guiding element can be positioned to influence the light from the eye as it travels towards the exit optical element. This setup is essential for the gaze-tracking system, where the reflection of the light off the eye needs to be directed to the optical element for further processing. It will be appreciated that by positioning the light-guiding element in this manner, the gaze-tracking system can capture the reflected light with high accuracy, improving precision of the gaze-tracking and ensuring effective eye movement detection, which is essential in applications like virtual reality, accessibility technologies, medical diagnostics, and similar.

A technical effect of the aforementioned feature is that it provides precise control over the positioning of the light-guiding element relative to the optical element, enhancing the efficiency and accuracy of direction of the light and manipulation, which is essential for achieving optimal optical performance in the device.

DETAILED DESCRIPTION OF THE DRAWINGS

Referring to FIG. 1, there is illustrated a block diagram of a device 100, in accordance with an embodiment of the present disclosure. The device 100 comprises a gaze-tracking system 102 and a light-guiding element 104. The gaze-tracking system 102 comprises a plurality of light emitters (depicted as light emitters 106a, 106b and 106c) and at least one light sensor (depicted as a light sensor 108). The light-guiding element 104 is implemented with respect to an optical element 110. The optical element 110 is, for example, depicted as a lens 110. Herein, the light-guiding element 104 at least directs light 112 emitted by the light emitters 106a-c towards an eye 114 of a user. Optionally, the light-guiding element 104 also directs reflections of the light 112 from the eye 114, towards the light sensor 108.

Optionally, the light-guiding element 104 comprises a light incoupling structure (depicted as light incoupling structures 116a and 116b), a light outcoupling structure 118, and a light-guiding part 120. The light incoupling structures 116a-b enable light 112 emitted by the plurality of light emitters to enter the light-guiding element. The light outcoupling structure 118 enabling the light to exit the light-guiding element towards the eye. The light-guiding part 120 either flat or curved, provides an optical coupling between the light incoupling structures 116a-b and the light outcoupling structure 118, for transferring the light 112 through the light-guiding element 104 by utilizing total internal reflection of the light 112.

Optionally, the light emitters 106a-c are arranged within a predefined region of an active area of a display module 122 of the device 100. Optionally, the device 100 further comprises a processor 124. Optionally, the processor 124 is communicably coupled with the gaze-tracking system 102. Optionally, the processor 124 is configured to: control the gaze-tracking system 102 such that the light emitters 106a-c emit the light 112 towards the light-guiding element 104, and the light sensor 108 captures sensor data pertaining to reflections of the emitted light from an ocular surface of the eye 114; and determine a gaze direction of the eye 114, based at least on the sensor data.

It may be understood by a person skilled in the art that FIG. 1 includes a simplified architecture of the head-mounted device 100, for sake of clarity, which should not unduly limit the scope of the claims herein. It is to be understood that the specific implementation of the device 100 is provided as an example and is not to be construed as limiting it to specific numbers or types of gaze-tracking systems, and light-guiding elements. The person skilled in the art will recognize many variations, alternatives, and modifications of embodiments of the present disclosure.

Figure 2A:
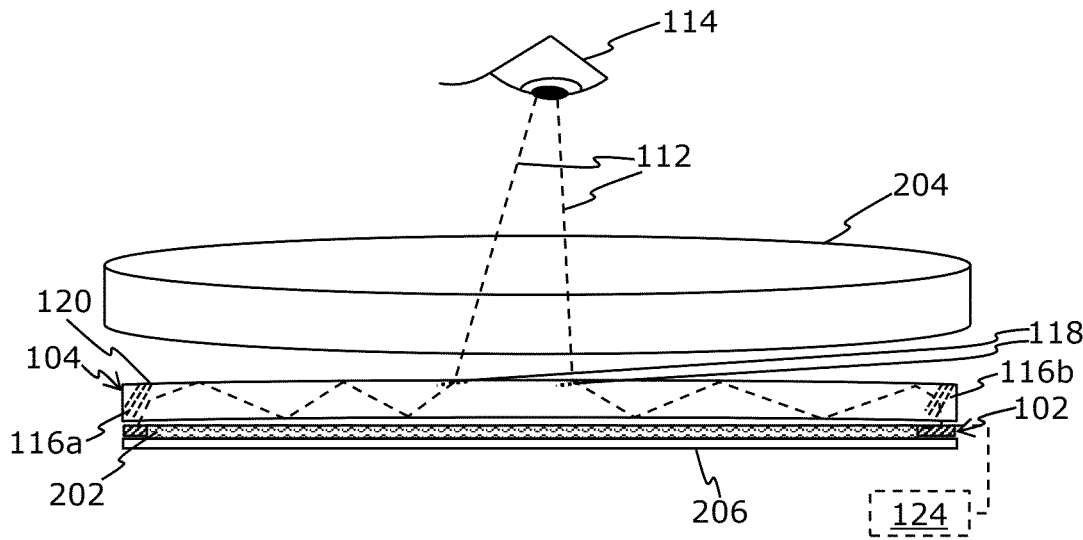

Referring to FIGS. 2A, 2B, and 2C, illustrated are different arrangements of the light-guiding element 120 of FIG. 1 within the device 100, in accordance with an embodiment of the present disclosure. In FIGS. 2A-C, the device 100 further comprises an optical element 202 and an exit optical element 204, and a structure backplane 206. The optical element 202 is, for example, depicted as a display module. The exit optical element 204 is, for example, depicted as a lens. In FIG. 2A, the light-guiding element 120 is arranged on an optical path between the optical element 202 and the exit optical element 204 of the device 100. In FIG. 2B, the light-guiding element 120 is arranged within the exit optical element 204 of the device 100. In FIG. 2C, the light-guiding element 120 is arranged on an optical path between the eye 114 and the exit optical element 204 of the device 100.

FIGS. 2A-C are merely examples, which should not unduly limit the scope of the claims herein. A person skilled in the art will recognize many variations, alternatives, and modifications of embodiments of the present disclosure.

Referring to FIG. 3, illustrated are steps of a method for integrating a light-guiding element into a device comprising a gaze-tracking system, the gaze-tracking system comprising a plurality of light emitters and at least one light sensor. At step 302, the light-guiding element is implemented with respect to an optical element of the device. At step 304, the light-guiding element is arranged within the wearable device such that the light-guiding element at least directs light emitted by the plurality of light emitters towards an eye of a user.

The aforementioned steps are only illustrative and other alternatives can also be provided where one or more steps are added, one or more steps are removed, or one or more steps are provided in a different sequence without departing from the scope of the claims herein.

The invention claimed is:

1. A device comprising:
   a gaze-tracking system comprising a plurality of light emitters and at least one light sensor; and
   a light-guiding element implemented with respect to an optical element of the device,
   wherein the light-guiding element is implemented as a nanostructured film laminated onto a curved or planar surface of the optical element, the nanostructured film having structural features at a nanometer scale and being configured to guide light by total internal reflection and diffraction, and
   wherein the light-guiding element at least directs light emitted by the plurality of light emitters towards an eye of a user.

2. The device of claim 1, wherein the light-guiding element comprises:
   a light incoupling structure for enabling the light emitted by the plurality of light emitters to enter the light-guiding element,
   a light outcoupling structure for enabling the light to exit the light-guiding element towards the eye, and
   a light-guiding part, either flat or curved, providing an optical coupling between the light incoupling structure and the light outcoupling structure, for transferring the light through the light-guiding element by utilizing total internal reflection of the light.

3. The device of claim 2, wherein the light incoupling structure comprises a plurality of light incoupling elements comprising at least two of: a prismatic structure, a triangular microstructure, diffraction gratings, a lens, a tapered structure, a micro-faceted mirror.

4. The device of claim 2, wherein the light outcoupling structure comprises a plurality of light outcoupling elements comprising at least two of: a micro-scale diffuser, a micro-prism, a micro-lens, a v-groove, surface gratings, surface scattering particles, a reflective film or coating.

5. The device of claim 2, wherein when the plurality of light emitters are infrared light emitters, the light incoupling structure and the light outcoupling structure are designed to guide light in the near-infrared (NIR) spectrum in range of 710 nm to 1000 nm.

6. The device of claim 5, wherein the light incoupling structure and the light outcoupling structure are designed to guide light in said near-infrared range so as to minimize impact on the user's visual experience.

7. The device of claim 1, wherein the light directed by the light-guiding element towards the eye is incident upon the eye within an angular range of 0 degrees to 45 degrees relative to a surface normal of the eye.

8. The device of claim 1, wherein the optical element is one of: a lens, a mirror, a beam splitter, a substrate, a display module, a polarizer, a diffuser.

9. The device of claim 1, wherein the plurality of light emitters are arranged within a predefined region of an active area of a display module of the device.

10. The device of claim 1, wherein the optical element is made of at least one of: glass, plastic, a flexible material.

11. The device of claim 1, wherein the optical element has one of: a curved surface, a planar surface, with respect to which the light-guiding element is implemented.

12. The device of claim 11, wherein the light-guiding element is implemented as a nanostructured film that is laminated onto the one of: the curved surface, the planar surface, of the optical element.

13. The device of claim 1, wherein the device further comprises a processor configured to:
   control the gaze-tracking system such that the plurality of light emitters emit the light towards the light-guiding element, and the at least one light sensor captures sensor data pertaining to reflections of the emitted light from an ocular surface of the eye;
   determine a gaze direction of the eye, based at least on the sensor data.

14. The device of claim 1, wherein the light-guiding element also directs reflections of the light from the eye, towards the at least one light sensor.

15. The device of claim 1, wherein the device is one of: a wearable device, a head-mounted display device, a set of extended-reality glasses.

16. The device of claim 1, wherein the nanostructured film is secured to the optical element by adhesive lamination and follows the curved or planar surface of the optical element.

17. The device of claim 1, wherein the light directed by the light-guiding element is in the near-infrared range of 710 nm to 1000 nm.

18. The device of claim 1, wherein the optical element comprises a lens and the nanostructured film is laminated onto a surface of the lens.

19. The device of claim 1, wherein the light-guiding element is positioned according to characteristics of the optical element of the device.

20. A method for integrating a light-guiding element into a device comprising a gaze-tracking system, the gaze-tracking system comprising a plurality of light emitters and at least one light sensor, the method comprising:

implementing the light-guiding element with respect to an optical element of the device;

further implementing the light-guiding element as a nano-structured film laminated onto a curved or planar surface of the optical element, the nanostructured film having structural features at a nanometer scale and being configured to guide light by total internal reflection and diffraction, and arranging the light-guiding element within the device such that the light-guiding element at least directs light emitted by the plurality of light emitters towards an eye of a user.

21. The method of claim 20, wherein the step of implementing the light-guiding element with respect to the optical element comprises one of:

arranging the light-guiding element on one of: a planar surface, a curved surface, of the optical element;

arranging the light-guiding element in proximity of one of: a planar surface, a curved surface, of the optical element;

embedding the light-guiding element within the optical element.

22. The method of claim 20, wherein the arrangement of the light-guiding element within the device is one of:

the light-guiding element is arranged on an optical path between the optical element and an exit optical element of the device;

the light-guiding element is arranged within an exit optical element of the device; or the light-guiding element is arranged on an optical path between the eye and an exit optical element of the device.

*    *    *    *    *